United States Patent
Kaneko

(10) Patent No.: US 9,391,483 B2
(45) Date of Patent: Jul. 12, 2016

(54) ROTARY ELECTRIC MACHINE, BEARING ATTACHING AND DETACHING JIG, AND BEARING REPLACEMENT METHOD

(75) Inventor: Kenta Kaneko, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 467 days.

(21) Appl. No.: 13/819,511

(22) PCT Filed: Oct. 6, 2010

(86) PCT No.: PCT/JP2010/067579
§ 371 (c)(1),
(2), (4) Date: Feb. 27, 2013

(87) PCT Pub. No.: WO2012/046314
PCT Pub. Date: Apr. 12, 2012

(65) Prior Publication Data
US 2013/0181559 A1 Jul. 18, 2013

(51) Int. Cl.
*H02K 9/00* (2006.01)
*H02K 5/20* (2006.01)
(Continued)

(52) U.S. Cl.
CPC ............... *H02K 5/16* (2013.01); *H02K 5/1732* (2013.01); *H02K 15/0006* (2013.01);
(Continued)

(58) Field of Classification Search
CPC ..... H02K 15/0006; H02K 15/16; H02K 9/06; H02K 5/16; H02K 5/1732; H02K 15/14
USPC ...................... 310/401, 425, 89, 90
See application file for complete search history.

(56) References Cited

U.S. PATENT DOCUMENTS

| 5,894,653 A * | 4/1999 | Nakamura ............. H02K 15/14 29/596 |
| 2003/0230948 A1* | 12/2003 | Murakami ............. H02K 1/276 310/156.53 |

(Continued)

FOREIGN PATENT DOCUMENTS

| DE | 19807738 A1 | 7/1999 |
| JP | 657064 U | 8/1994 |

(Continued)

OTHER PUBLICATIONS

Extended European Search Report dated Oct. 4, 2013, issued by European Patent Office in corresponding European Patent Application No. 10858122.4-1804. (6 pgs.).

(Continued)

*Primary Examiner* — Dang Le
*Assistant Examiner* — Leda Pham
(74) *Attorney, Agent, or Firm* — Buchanan Ingersoll & Rooney PC

(57) ABSTRACT

To provide a rotary electric machine including a stator iron core, a rotor including a lamination core that is arranged within the stator iron core and is constituted by laminating electromagnetic steel plates and iron core holders that cover both ends of the lamination core, a frame including a cylindrical portion that encloses the stator iron core and the rotor and a rotor-shaft supporting unit that extends in the direction of a rotor shaft and supports the rotor shaft, and cartridges that are detachably attached to the rotor-shaft supporting unit and rotatably support the rotor shaft, in which on the iron core holder and the iron core holder, recessed portions are circumferentially provided, into which end portions of jigs that are inserted through the rotor-shaft supporting unit to enable the cartridges to be detached and attached are fitted.

7 Claims, 14 Drawing Sheets

(51) Int. Cl.
*H02K 5/16* (2006.01)
*H02K 5/173* (2006.01)
*H02K 15/00* (2006.01)
*H02K 15/14* (2006.01)
*H02K 9/06* (2006.01)
*H02K 15/16* (2006.01)

(52) U.S. Cl.
CPC .................. *H02K 15/14* (2013.01); *H02K 5/20* (2013.01); *H02K 9/06* (2013.01); *H02K 15/16* (2013.01); *Y10T 29/53143* (2015.01)

(56) References Cited

U.S. PATENT DOCUMENTS

2008/0115527 A1* 5/2008 Doty .................. F04D 25/0606
 62/498
2012/0062076 A1* 3/2012 Nagayama ........... H02K 5/1732
 310/401

FOREIGN PATENT DOCUMENTS

| JP | 2004-124991 A | | 4/2004 |
|----|---------------|---|--------|
| JP | 2008-099491 A | | 4/2008 |
| JP | 2008099491 A | * | 4/2008 |
| JP | 2009-107790 A | | 5/2009 |
| JP | 2009107790 A | * | 5/2009 |

OTHER PUBLICATIONS

European Office Action dated Jul. 30, 2014 issued in corresponding Eurpean Patent Appln. No. 10 858 122.4-1804 (4 pages).

Office Action (Patent Examination Report No. 1) issued on Apr. 8, 2014, by the Australian Patent Office in corresponding Australian Patent Application No. 2010361844. (3 pages).

International Search Report (PCT/ISA/210) issued on Nov. 22, 2010, by the Japanese Patent Office as the International Searching Authority for International Application No. PCT/JP2010/067579.

Written Opinion (PCT/ISA/237) issued on Nov. 4, 2010, by the Japanese Patent Office as the International Searching Authority for International Application No. PCT/JP2010/067579.

* cited by examiner

ROTARY ELECTRIC MACHINE, BEARING ATTACHING AND DETACHING JIG, AND BEARING REPLACEMENT METHOD

FIELD

The present invention relates to a rotary electric machine for driving a railway vehicle, a bearing attaching and detaching jig, and a bearing replacement method.

BACKGROUND

Generally, as a rotary electric machine for a railway vehicle, a hermetic rotary electric machine is often employed from the viewpoint of saving on maintenance. The hermetic rotary electric machine is configured to mainly include a cylindrically-shaped frame in which a rotor is arranged on its inner peripheral side and housings that are provided at opposite ends of the frame and rotatably support a rotor shaft. A bearing is provided at a center portion of the housing, and a cylindrical stator iron core in which a stator coil is accommodated is mounted on an inner peripheral portion of the frame. A uniform gap is formed between an inner peripheral surface of the stator iron core and an outer peripheral surface of the rotor.

In the hermetic rotary electric machine configured as described above, periodic maintenance needs to be performed on the bearing although cleaning work for the rotor and the like is unnecessary. At the time of maintenance, it is a common procedure that the rotor is first pulled out from the frame, and then the bearing is removed.

As means for saving this work, a traction motor shown in Patent Literature 1 mentioned below has a mode in which a rotor is fixed by a plurality of bolts inserted from the bearing bracket side toward the rotor, and thereafter a housing having a bearing fixed thereon is detached.

CITATION LIST

Patent Literature

Patent Literature 1: Japanese Patent Application Laid-open No. 2008-99491 (FIG. 6)

SUMMARY

Technical Problem

However, according to the above conventional technique, a rotor is supported by using a friction force of a distal end of a bolt inserted from a bearing bracket. Therefore, there is a problem that it is difficult to stably fix the rotor by only using this friction force. In addition, according to the above conventional technique, the bolt is relatively long, and therefore there is a case where the rotor fixed by the bolt becomes unstable due to deformation of the bolt. In this case, the axial center position of the rotor is displaced from the axial center position of a frame. Therefore, there is a problem that there is not only a possibility that an inner peripheral surface of a stator iron core and an outer peripheral surface of the rotor contact with each other and are damaged, but there is also a case where bearing attachment and detachment is difficult.

The present invention has been achieved to solve the above problems, and an object of the present invention is to provide a rotary electric machine, a bearing attaching and detaching jig, and a bearing replacement method that can facilitate bearing attachment and detachment work.

Solution to Problem

A rotary electric machine according to one aspect of the present invention is configured to include, a stator, a rotor including a rotor core that is arranged within the stator and is constituted by laminating electromagnetic steel plates and an iron core holder that covers both ends of the rotor core; a frame including a cylindrical portion that encloses the stator and the rotor and a rotor-shaft supporting unit that extends in the direction of the rotor shaft and supports the rotor shaft; and a bearing portion that is detachably attached to the rotor-shaft supporting unit and rotatably supports the rotor shaft, wherein on the iron core holder, a recessed portion is circumferentially provided, into which an end portion of a jig that is inserted through the rotor-shaft supporting unit is fitted to enable the bearing portion to be detached and attached.

Advantageous Effects of Invention

The present invention includes a rotor including an iron core holder that covers both ends of a lamination core, a bracket portion that is arranged at both ends of a frame and supports a rotor shaft, and a bearing portion that rotatably supports the rotor shaft, and on the iron core holder, a recessed portion into which an end portion of a jig is fitted is circumferentially provided. Therefore, bearing attachment and detachment work can be facilitated.

DESCRIPTION OF EMBODIMENTS

Exemplary embodiments of a rotary electric machine, a bearing attaching and detaching jig, and a bearing replacement method according to the present invention will be explained below in detail with reference to the accompanying drawings. The present invention is not limited to the embodiments. In the following explanations, for simplicity, some constituent elements are mentioned only by their reference signs.

Embodiment

Figure 1:
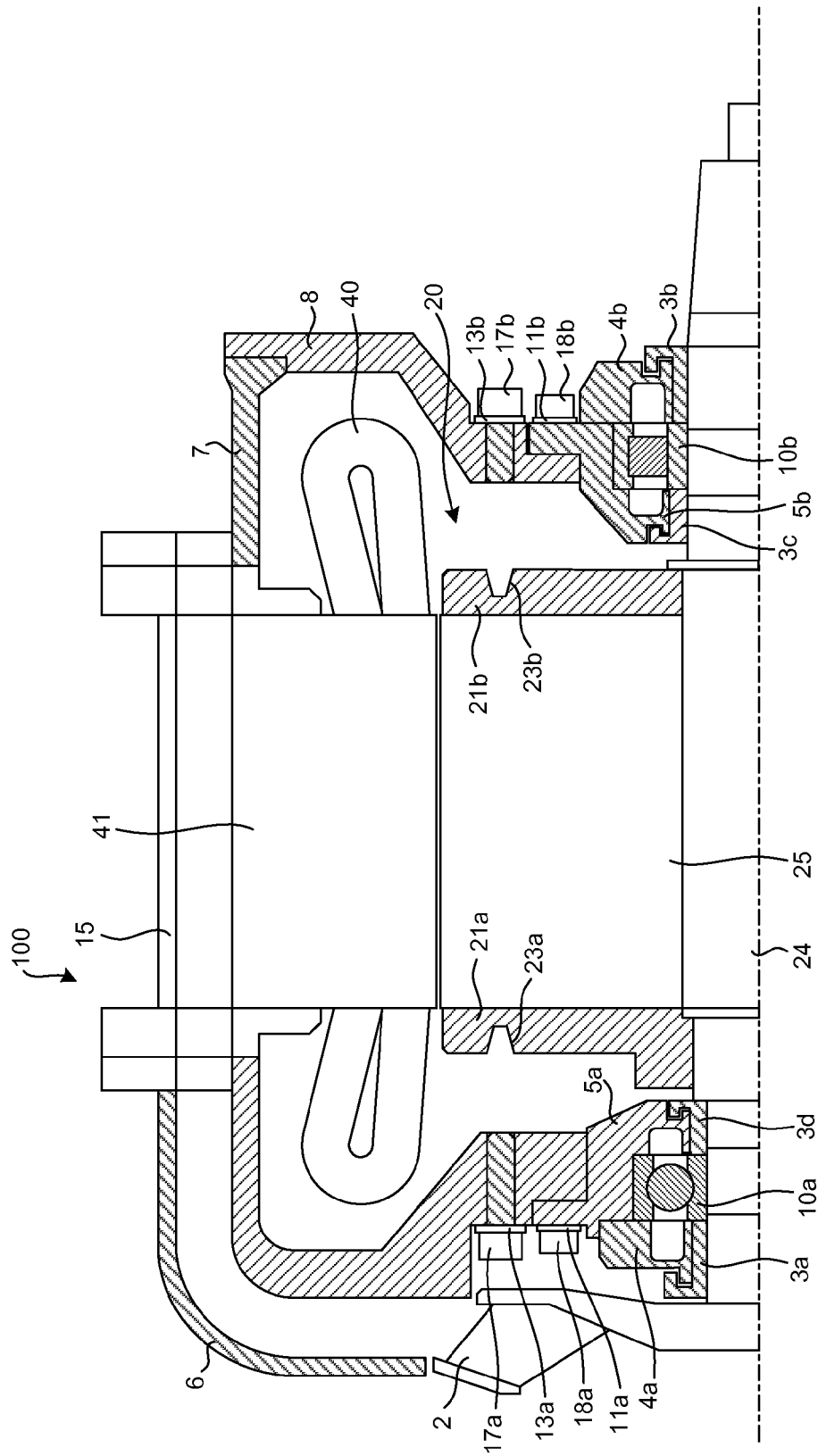
FIG. 1 is a vertical sectional view of a rotary electric machine according to an embodiment of the present invention.
Figure 2:
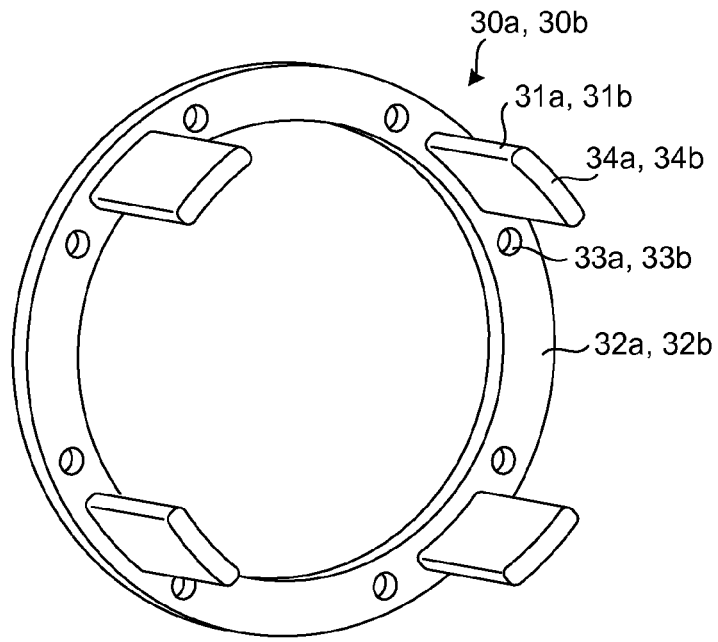
FIG. 2 depicts the configuration of annular jigs.
Figure 3:
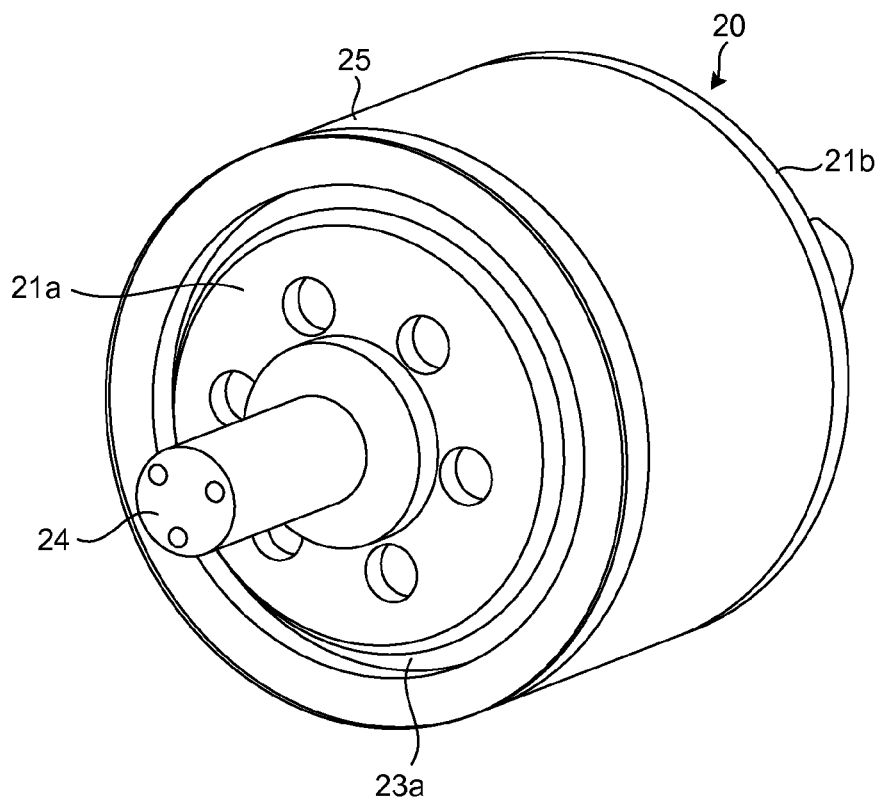
FIG. 3 is a perspective view of a rotor, depicting a driven-side iron core holder at the center thereof.
Figure 4:
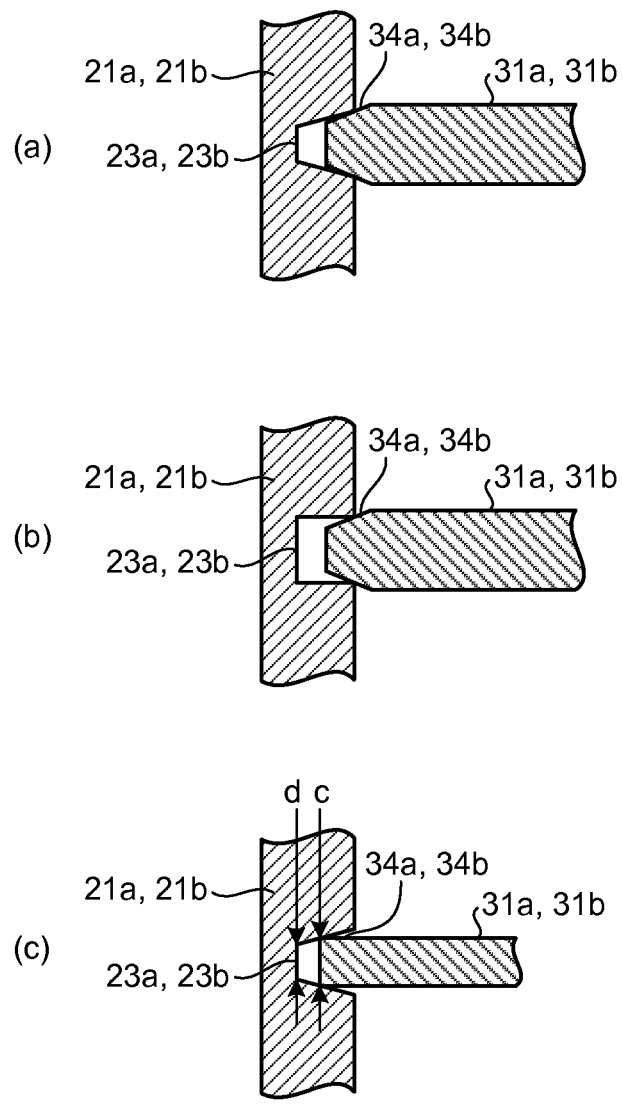
FIGS. 4(a), (b), and (c) are explanatory diagrams of the shape of groove portions formed on a driven-side iron core holder or a driving-side iron core holder, and the shape of each end portion of rotor supporting units.

FIG. 1 is a vertical sectional view of a rotary electric machine 100 according to an embodiment of the present invention, and FIG. 2 depicts the configuration of annular jigs 30. FIG. 3 is a perspective view of a rotor 20, depicting a driven-side iron core holder 21a at the center thereof, and FIG. 4 is an explanatory diagram of the shape of recessed portions 23a and 23b formed on the driven-side iron core holder 21a or a driving-side iron core holder 21b, and the shape of each end portion of rotor supporting units (supporting units) 31a and 31b.

In the following explanations, the configuration of the rotary electric machine 100 shown in FIG. 1 is explained, and thereafter annular jigs 30a and 30b are explained with reference to FIG. 2, and the configuration of the rotor 20 is explained with reference to FIG. 3. To clearly explain the configuration of the rotary electric machine 100, the side of a third bracket portion (rotor-shaft supporting unit) 8 with respect to the rotor 20 and the side of a first bracket portion (rotor-shaft supporting unit) 6 with respect to the rotor 20 are defined as "driving side" and "driven side", respectively.

The rotary electric machine 100 shown in FIG. 1 is configured to include a cylindrically-shaped frame 15 in which the rotor 20 is arranged on its inner peripheral side, and a first bracket portion 6 and a third bracket portion 8 that are provided in such a manner as to face to respective ends of the frame (cylindrical portion) 15.

Because a bearing 10a is provided in the first bracket portion 6 and a bearing 10b is provided in the third bracket portion 8, a rotor shaft 24 is rotatably supported by these bearings 10a and 10b.

A lamination core 25 constituted by laminating electromagnetic steel plates is arranged at the center portion of the rotor 20. At each end of the lamination core 25, the iron core holder 21a and the iron core holder 21b are respectively arranged so as to interpose the lamination core 25 therebetween. For example, the iron core holder 21a is shrink-fitted on the driven side of the lamination core 25, while the iron core holder 21b is shrink-fitted on the driving side of the lamination core 25.

A cylindrical stator iron core (stator) 41 in which a stator coil 40 is accommodated is mounted on an inner peripheral portion of the frame 15. A uniform gap is formed between the inner peripheral surface of the stator iron core 41 and the outer peripheral surface of the lamination core 25.

With this configuration, a rotational force of the rotor 20 is transmitted to a wheel via a coupling unit and a gear (both not shown).

The configuration of the rotary electric machine 100 on its driven side is explained next. The first bracket portion 6 is arranged on the driven side of the frame 15 and constitutes a part of a casing of the rotary electric machine 100. A cartridge (a bearing portion) 5a is fitted to a center part of the first bracket portion 6. The cartridge 5a accommodates therein the bearing 10a that rotatably supports one end of the rotor shaft 24, and includes a lubricating grease pocket for the bearing 10a. With this configuration, the cartridge 5a and a bearing stopper 3d constitute a labyrinth structure. Furthermore, the cartridge 5a is fixed by a bolt 18a screwed from the driven side through a washer 11a into the first bracket portion 6. The cartridge 5a can be attached and detached in the axial direction of the rotor shaft 24 with the rotor 20 inserted within the frame 15. The labyrinth structure is a structure that constitutes a boundary between a rotary portion and a stationary portion, which prevents leakage of lubricating grease, and also prevents entry of external objects from outside into the cartridges 5a and 5b, and also to the inside of the rotary electric machine 100.

A bearing cap 4a holds lubricating grease and constitutes a labyrinth structure with a bearing stopper 3a, thereby preventing lubricating grease from leaking out of the rotary electric machine. The bearing stopper 3d positions the bearing 10a and constitutes a labyrinth structure with the cartridge 5a, thereby preventing lubricating grease from leaking to the rotor 20 side.

The bearing stopper 3a is attached to an end of the rotor shaft 24. As described above, the bearing cap 4a and the cartridge 5a include a lubricating grease pocket. With this configuration, grease is supplied to the bearing 10a. Furthermore, the bearing cap 4a and the bearing stopper 3a, and also the cartridge 5a and the bearing stopper 3d constitute a labyrinth structure. Accordingly, grease leakage can be suppressed.

A fan 2 has a plurality of fins radially arranged from its center. A flow passage of air flowing in from outside of the rotary electric machine 100 is formed in the first bracket portion 6. With this configuration, when the rotor shaft 24 rotates, the rotary electric machine 100 is effectively cooled by air introduced into the inside of the rotary electric machine 100.

The configuration of the rotary electric machine 100 on its driving side is explained next in detail. A second bracket portion 7 is arranged on the driving side of the frame 15 and constitutes a part of the casing of the rotary electric machine 100. The third bracket portion 8 is arranged on the driving side of the second bracket portion 7. The third bracket portion 8 and the second bracket portion 7 constitute a part of the casing of the rotary electric machine 100. The cartridge (the bearing portion) 5b is fitted to a center part of the third bracket portion 8. The cartridge 5b accommodates therein the bearing 10b that rotatably supports the other end of the rotor shaft 24, and includes a lubricating grease pocket for the bearing 10b. With this configuration, the cartridge 5b and a bearing stopper 3c constitute a labyrinth structure. The cartridge 5b is fixed by a bolt 18b screwed from the driving side through a washer 11b into the third bracket portion 8. The cartridge 5b can be detached and attached in the axial direction of the rotor shaft 24 with the rotor 20 inserted within the frame 15.

A bearing stopper 3b is attached to an end of the rotor shaft 24. A bearing cap 4b holds lubricating grease and constitutes a labyrinth structure with the bearing stopper 3b, thereby preventing lubricating grease from leaking out of the rotary electric machine 100. The bearing stopper 3c positions the bearing 10b and constitutes a labyrinth structure with the cartridge 5b, thereby preventing lubricating grease from leaking to the rotor 20 side. As described above, the bearing cap 4b and the cartridge 5b include a lubricating grease pocket. With this configuration, grease is supplied to the bearing 10b. Furthermore, the bearing cap 4b and the bearing stopper 3b, and also the cartridge 5b and the bearing stopper 3c constitute a labyrinth structure. Accordingly, grease leakage can be suppressed.

The configuration of the annular jigs 30a and 30b used for attaching and detaching the cartridges 5a and 5b is explained next with reference to FIG. 2.

The annular jig 30a is attached to the first bracket portion 6 shown in FIG. 1. The annular jig 30b is attached to the third bracket portion 8 shown in FIG. 1. These annular jigs 30a and 30b are jigs that fix the rotor 20 without bringing the lamination core 25 into contact with the stator iron core 41 when the cartridges 5a and 5b are detached and attached.

The annular jigs 30a and 30b are respectively configured to mainly include annular plates 32a and 32b and a plurality of rotor supporting units 31a and 31b that are uprightly arranged on the annular plates 32a and 32b.

The cross section of the rotor supporting unit 31a along a circumferential direction of the annular plate 32a has an R-shape and extends along a circle constituted by the recessed portion 23a. Similarly, a cross section of the rotor supporting unit 31b along a circumferential direction of the annular plate 32b has an R-shape and extends along a circle constituted by the recessed portion 23b. As described above, when the cross section of each of the rotor supporting units 31a and 31b has an R-shape, not only attachment and detachment of the annular jigs 30a and 30b can be facilitated, but also the rigidity of the rotor supporting units 31a and 31b relative to the weight of the rotor 20 can be enhanced. The sectional shape of end portions 34a and 34b is described later.

The inner diameter of the annular plate 32a is formed with a size enough for detaching and attaching the cartridge 5a when the annular jig 30a is attached to the first bracket portion 6. The annular plate 32a includes a plurality of bolt insertion holes 33a. The annular jig 30a is fixed to the first bracket portion 6 by predetermined bolts inserted from outside of the annular jig 30a. Similarly, the inner diameter of the annular plate 32b is formed with a size enough for detaching and attaching the cartridge 5b when the annular jig 30b is attached to the third bracket portion 8. The annular plate 32b includes a plurality of bolt insertion holes 33b, and the annular jig 30b is fixed to the third bracket portion 8 by predetermined bolts inserted from outside of the annular jig 30b.

The configuration of the rotor 20 according to the present embodiment is explained next with reference to FIG. 3. FIG. 3 is a perspective view of the rotor 20, depicting the driven-side iron core holder 21a at the center thereof. The lamination core 25 has a structure in which thin plates are laminated on the rotor shaft 24. The iron core holder 21a and the iron core holder 21b are oppositely arranged at respective ends of the lamination core 25. Both the iron core holder 21a and the iron core holder 21b are formed to be of a disk shape that is made of iron or SUS.

The recessed portion 23a having a tapered shape that is tapered from outside toward the direction of the rotor 20 or having a rectangular shape is circumferentially provided on a surface of the iron core holder 21a. While the position of the recessed portion 23a is not particularly limited, it is desirably close to an outer periphery of the rotor 20, in consideration of the position of the end portion 34a of the rotor supporting unit 31a inserted from the first bracket portion 6. Similarly, the recessed portion 23b having a tapered shape that is tapered from outside toward the direction of the rotor 20 or having a rectangular shape is circumferentially provided on a surface of the iron core holder 21b. In addition, the position of the recessed portion 23b is desirably close to an outer periphery of the rotor 20, in consideration of the position of the end portion 34b of the rotor supporting unit 31b inserted from the third bracket portion 8.

The shape of the end portion 34a of the rotor supporting unit 31a and the end portion 34b of the rotor supporting unit 31b, the fitting structure between the recessed portion 23a formed on the iron core holder 21a and the end portion 34a of the rotor supporting unit 31a, and a fitting structure between the recessed portion 23b formed on the iron core holder 21b and the end portion 34b of the rotor supporting unit 31b are explained next with reference to FIG. 4.

FIG. 4 is an explanatory diagram of the shape of a recessed portion formed on the driven-side iron core holder 21a or the driving-side iron core holder 21b and the shape of the end portions 34a and 34b of the rotor supporting units 31a and 31b.

The cross section of the end portions 34a and 34b shown in FIG. 4(a) is a sectional portion extending along the radial direction of the rotor 20, and is formed into a tapered shape that is tapered from a base end of the rotor supporting units 31a and 31b toward a distal end thereof. Similarly, the cross section of the recessed portions 23a and 23b is a sectional portion extending along the radial direction of the rotor 20, and is formed into a tapered shape. However, the taper angle of the recessed portions 23a and 23b relative to the longitudinal direction of the rotor supporting units 31a and 31b is slightly smaller than the taper angle of the end portions 34a and 34b. As described above, when the taper angle of the ends 34a and 34b is larger than the taper angle of the recessed portions 23a and 23b, the rotor 20 can be fixed without displacing the axial center position of the rotor 20 from the axial center position of the frame 15.

FIG. 4(b) is a modification example of the cross-sectional shape of the recessed portions 23a and 23b. The cross section of the end portions 34a and 34b shown in FIG. 4(b) is formed into a tapered shape similarly to the end portions 34a and 34b shown in FIG. 4(a). On the other hand, the cross section of the recessed portions 23a and 23b shown in FIG. 4(b) is a cross-sectional portion extending along the radial direction of the rotor 20 as described above; however, it is formed into a rectangular shape. In this manner, even when the cross section of the end portions 34a and 34b is formed into a tapered shape and the cross section of the recessed portions 23a and 23b is formed into a rectangular shape, the rotor 20 can also be fixed without displacing the axial center position of the rotor 20 from the axial center position of the frame 15.

FIG. 4(c) is a modification example of a cross-sectional shape of the ends 34a and 34b. The cross section of the recessed portions 23a and 23b shown in FIG. 4(c) is formed into a tapered shape similarly to the recessed portions 23a and 23b shown in FIG. 4(a). On the other hand, the cross section of the ends 34a and 34b shown in FIG. 4(c) is a sectional portion extending along a radial direction of the rotor 20, and is formed into a rectangular shape. Furthermore, when the thickness of the end portions 34a and 34b and the width of the bottom surface of the recessed portions 23a and 23b are represented as "c" and "d", respectively, the thickness c of the end portions 34a and 34b is formed wider than the width d of the bottom surface of the recessed portions 23a and 23b. In this manner, even when the cross section of the end portions 34a and 34b is formed into a rectangular shape and the cross section of the recessed portions 23a and 23b is formed into a tapered shape, the rotor 20 can also be fixed without displacing the axial center position of the rotor 20 from the axial center position of the frame 15. In addition, the number of processes for machining the end portions 34a and 34b can be reduced.

The sectional shape of the end portions 34a and 34b and the recessed portions 23a and 23b shown in FIG. 4 are just examples, and can also be configured as follows.

First, a case in which a cross section of the recessed portions 23a and 23b is formed into a tapered shape is explained. (1) The cross section of the recessed portions 23a and 23b along the radial direction of the rotor 20 is assumed to be formed into a tapered shape in which the end portions 34a and 34b of the annular jigs 30a and 30b can contact a side surface of the recessed portions 23a and 23b before the ends 34a and 34b reach the bottom surface of the recessed portions 23a and 23b. At this time, the cross section of the ends 34a and 34b along the radial direction of the rotor 20 when the end portions 34a and 34b are fitted into the recessed portions 23a and 23b can be formed into a rectangular shape (1a) or a tapered shape (1b). The shape formed by combining (1) and (1a) corresponds to the shape in FIG. 4(c).

Next, a case in which a cross section of the end portions 34a and 34b is formed into a tapered shape is explained. (2) The cross section of the end portions 34a and 34b along the radial direction of the rotor 20 when the end portions 34a and 34b are fitted into the recessed portions 23a and 23b is assumed to be formed into a tapered shape in which a top of the recessed portions 23a and 23b can contact the end portions 34a and 34b before the end portions 34a and 34b reach the bottom surface of the recessed portions 23a and 23b. At this time, the cross section of the recessed portions 23a and 23b along the radial direction of the rotor 20 can be formed into a rectangular shape (2a) or a tapered shape (2b). The shape formed by combining (2) and (2a) corresponds to the shape in FIG. 4(b). The shape formed by combining (2) and (2b) corresponds to the shape in FIG. 4(a).

A bearing replacement method using the annular jigs 30a and 30b is explained next.

Figure 5:
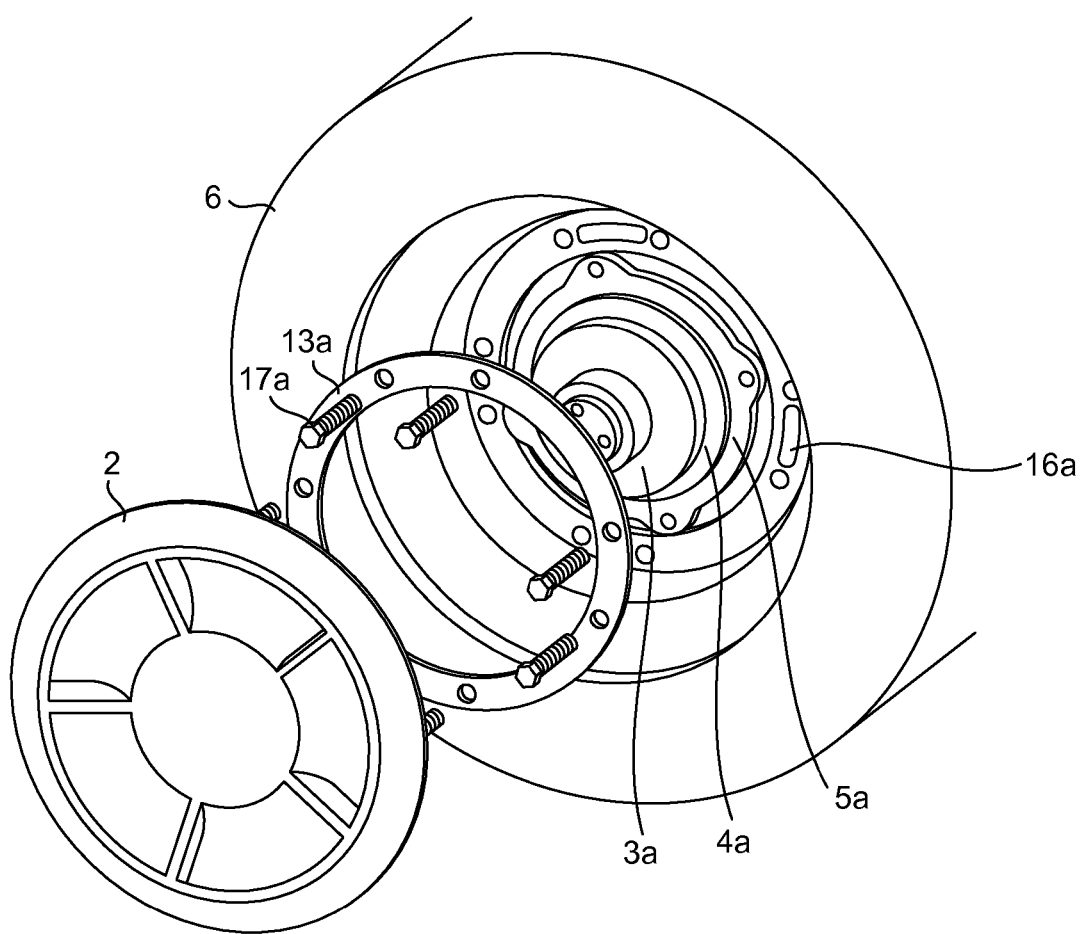
FIG. 5 is a perspective view of a state of the rotary electric machine in which a cover and the like are removed from a first bracket portion.
Figure 7:
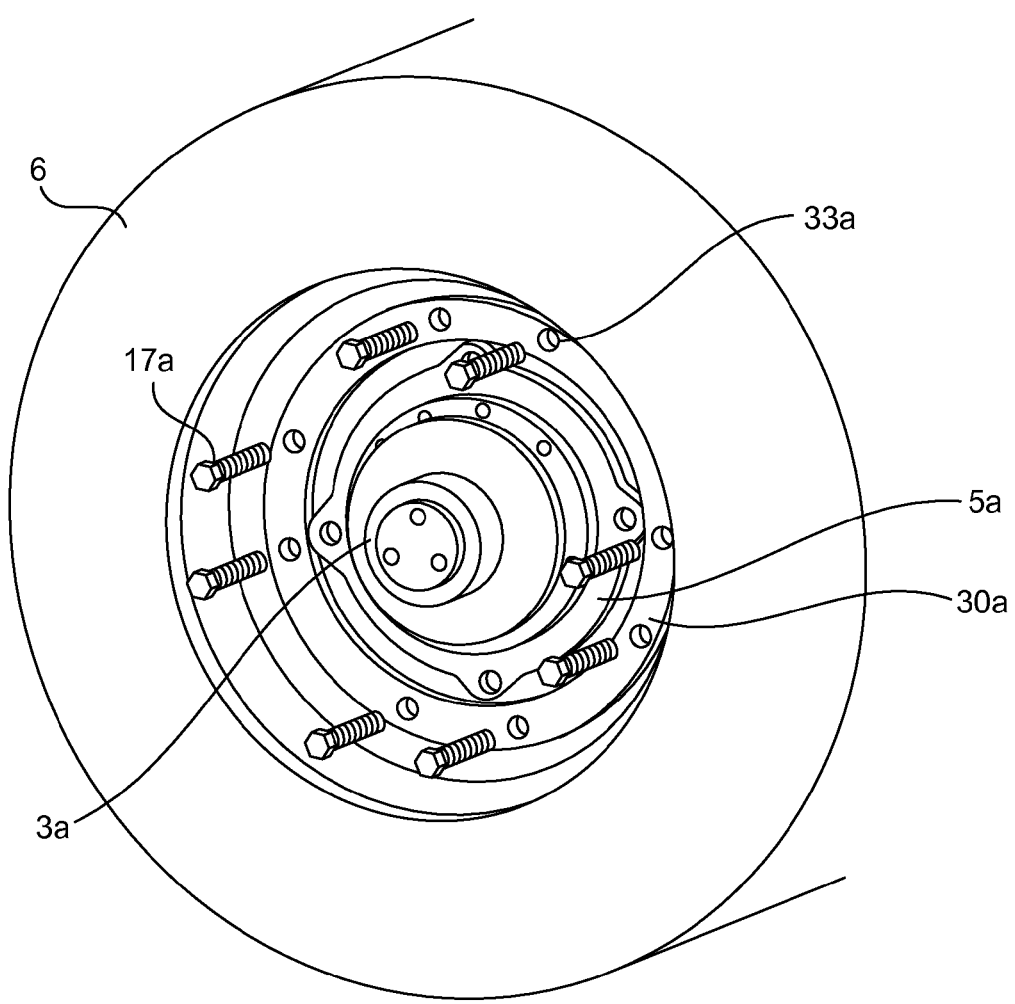
FIG. 7 is a perspective view of a state of the rotary electric machine in which the annular jig is attached to the first bracket portion.
Figure 8:
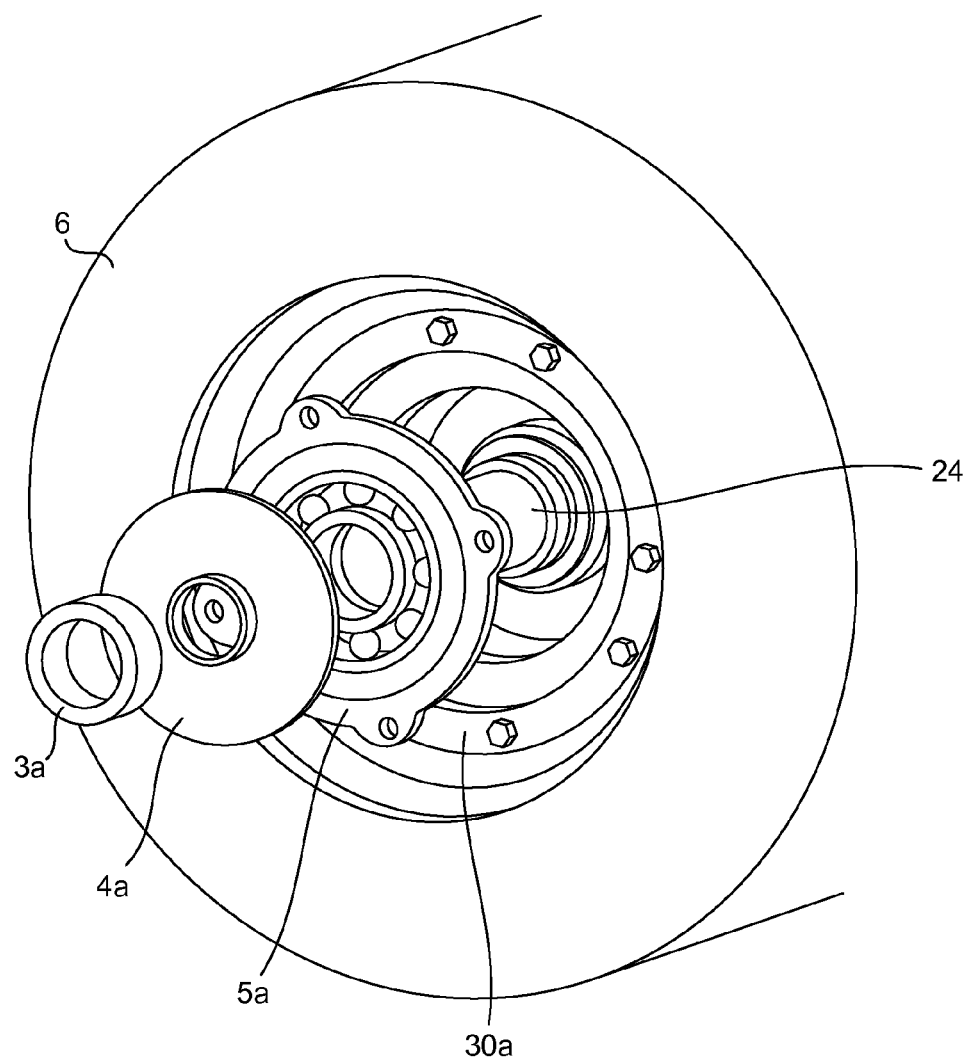
FIG. 8 is a perspective view of a state of the rotary electric machine in which a bearing stopper and the like are removed from the first bracket portion.

First, an operation to remove the cartridge 5a is explained with reference to FIGS. 5 to 8. FIG. 5 is a perspective view of a state of the rotary electric machine 100 in which the fan 2 and the like are removed from the first bracket portion 6, FIG. 6 is a perspective view of the rotary electric machine 100 while depicting a relationship between the annular jig 30a and the first bracket portion 6, FIG. 7 is a perspective view of a state of the rotary electric machine 100 in which the annular jig 30a is attached to the first bracket portion 6, and FIG. 8 is a perspective view of a state of the rotary electric machine 100 in which the bearing stopper 3a and the like are removed from the first bracket portion 6.

As shown in FIG. 5, at the time of maintenance of the bearing 10a, the fan 2, bolts 17a, and a cover 13a are removed in this order. The cover 13a closes insertion holes 16a through which the rotor supporting unit 31a is inserted, and is attached to the first bracket portion 6 by the bolt 17a at the time when maintenance is not performed. The maintenance means here replacing the bearing 10a and changing grease.

The bearing stopper 3a, the bearing cap 4a, and the cartridge 5a are attached to the rotary electric machine 100 after removing the fan 2, the bolts 17a, and the cover 13a. That is, the bearing stopper 3a remains attached to the rotor shaft 24, and the cartridge 5a is fixed to the first bracket portion 6 by the bolts 18a (see FIG. 1). In FIG. 5, the bolts 18a are not shown for simplicity.

Figure 6:
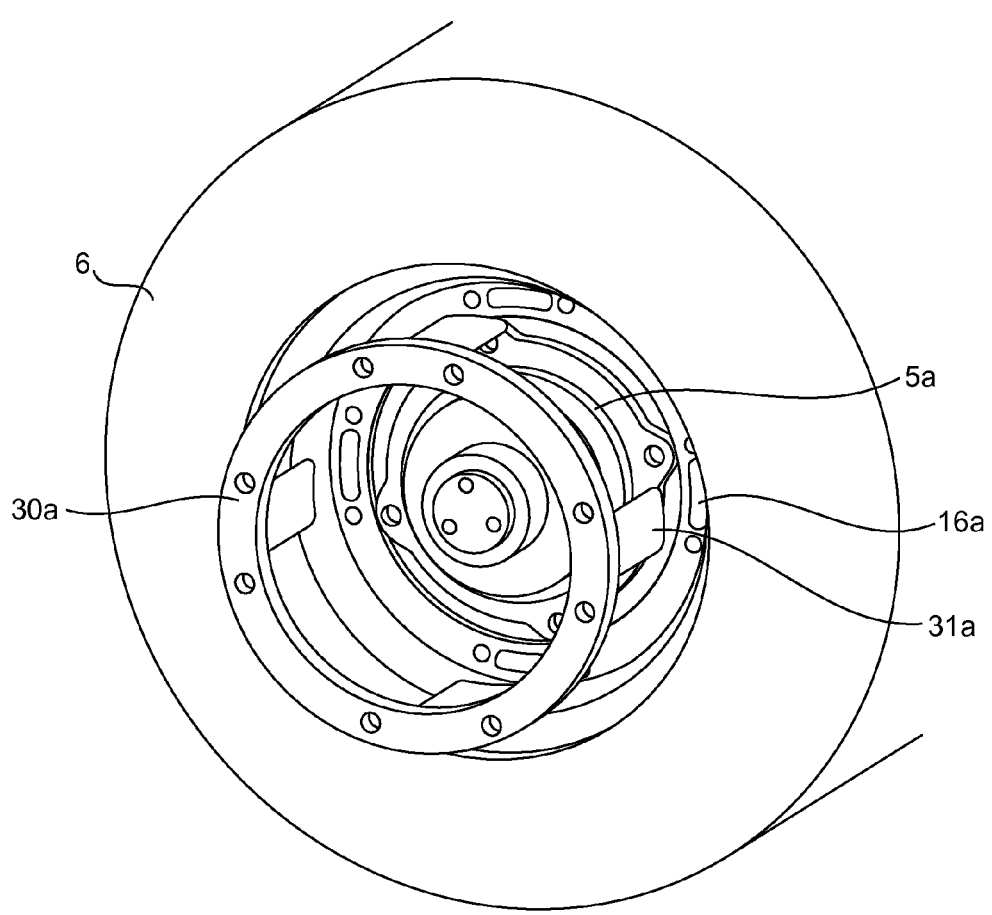
FIG. 6 is a perspective view of the rotary electric machine, depicting a relationship between an annular jig and the first bracket portion.

FIG. 6 depicts a state in which the rotor supporting unit 31a is inserted into the insertion hole 16a. Although four insertion holes 16a for the rotor supporting units 31a are shown in FIG. 6, it is assumed that the number of the insertion holes 16a corresponds to the number of the rotor supporting units 31a.

Next, as shown in FIG. 7, while the annular jig 30a is attached to the first bracket portion 6, if a gap is created between the end portions 34a (see FIG. 2) and the recessed portions 23a (see FIG. 1), there is a possibility that the axial center position of the rotor 20 is displaced and the outer peripheral surface of the lamination core 25 interferes with the inner peripheral surface of the stator iron core 41. To prevent such interference, it is desirable to screw the bolts 17a into the bolt insertion holes 33a so as to fix the annular jig 30a to the first bracket portion 6.

As shown in FIG. 7, the cartridge 5a which is arranged on an inner-diameter side of the annular jig 30a attached to the first bracket portion 6 is in condition that can be detached and attached. At this time, the iron core holder 21a is fixed by the annular jig 30a, and therefore, even when the cartridge 5a is removed in this state, the lamination core 25 does not contact the stator iron core 41. Therefore, as shown in FIG. 8, the cartridge 5a can be removed after removing the bearing stopper 3a. It suffices that after a new cartridge 5a in which the bearing 10a and grease are replaced is attached, the bolt 17a and the annular jig 30a are removed and the cover 13a, the bolt 17a, and the fan 2 are attached in this order. The bearing cap 4a remains attached to the cartridge 5a and is removed along with the cartridge 5a. Thereafter, the bearing cap 4a is removed from the cartridge 5a, thereby taking out the bearing 10a.

Figure 9:
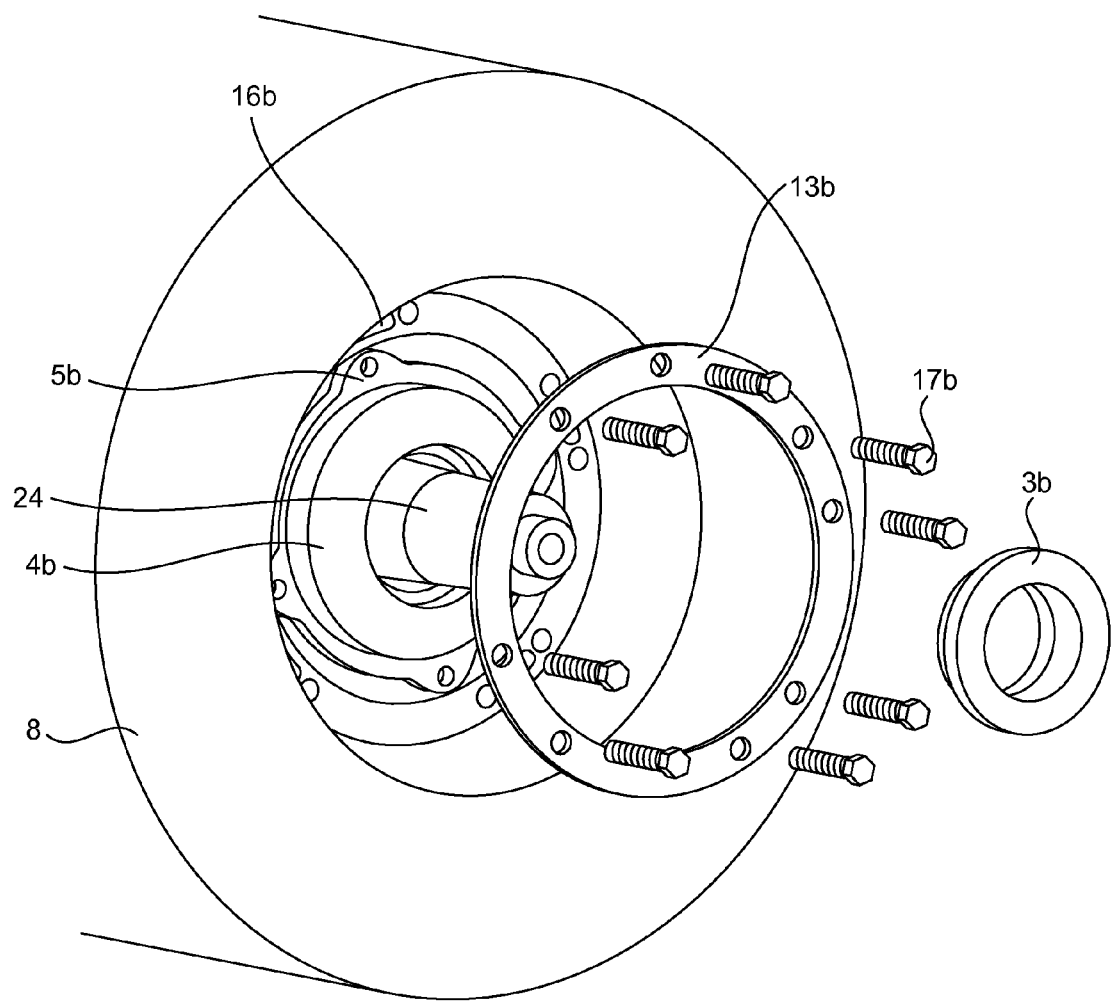
FIG. 9 is a perspective view of a state of the rotary electric machine in which the bearing stopper and the like on a side of a third bracket portion are removed.

An operation to remove the cartridge 5b is explained next with reference to FIGS. 9 to 11. FIG. 9 is a perspective view of a state of the rotary electric machine 100 in which the bearing stopper 3b and the like on the side of the third bracket portion 8 are removed, FIG. 10 is a perspective view of a state of the rotary electric machine 100 in which attaching of the annular jig 30b to the third bracket portion 8 is in progress, and FIG. 11 is a perspective view of a state of the rotary electric machine 100 in which the annular jig 30b is attached to the third bracket portion 8.

As shown in FIG. 9, at the time of maintenance of the bearing 10b, the bearing stopper 3b, bolts 17b, and a cover 13b are removed first. The cover 13b closes insertion holes 16b through which the rotor supporting units 31b are inserted, and is attached to the third bracket portion 8 by the bolts 17b at the time when maintenance is not performed.

The bearing cap 4b and the cartridge 5b are attached to the rotary electric machine 100 after removing the bearing stopper 3b, the bolts 17b, and the cover 13b. That is, the bearing cap 4b remains attached to the cartridge 5b by bolts (not shown), and the cartridge 5b is fixed to the third bracket portion 8 by the bolts 18b (see FIG. 1). In FIG. 9, the bolt 18b and the insertion holes 16b of a corresponding number are not shown for simplicity. However, the number of the insertion holes 16b corresponds to the number of the rotor supporting units 31b.

Figure 10:
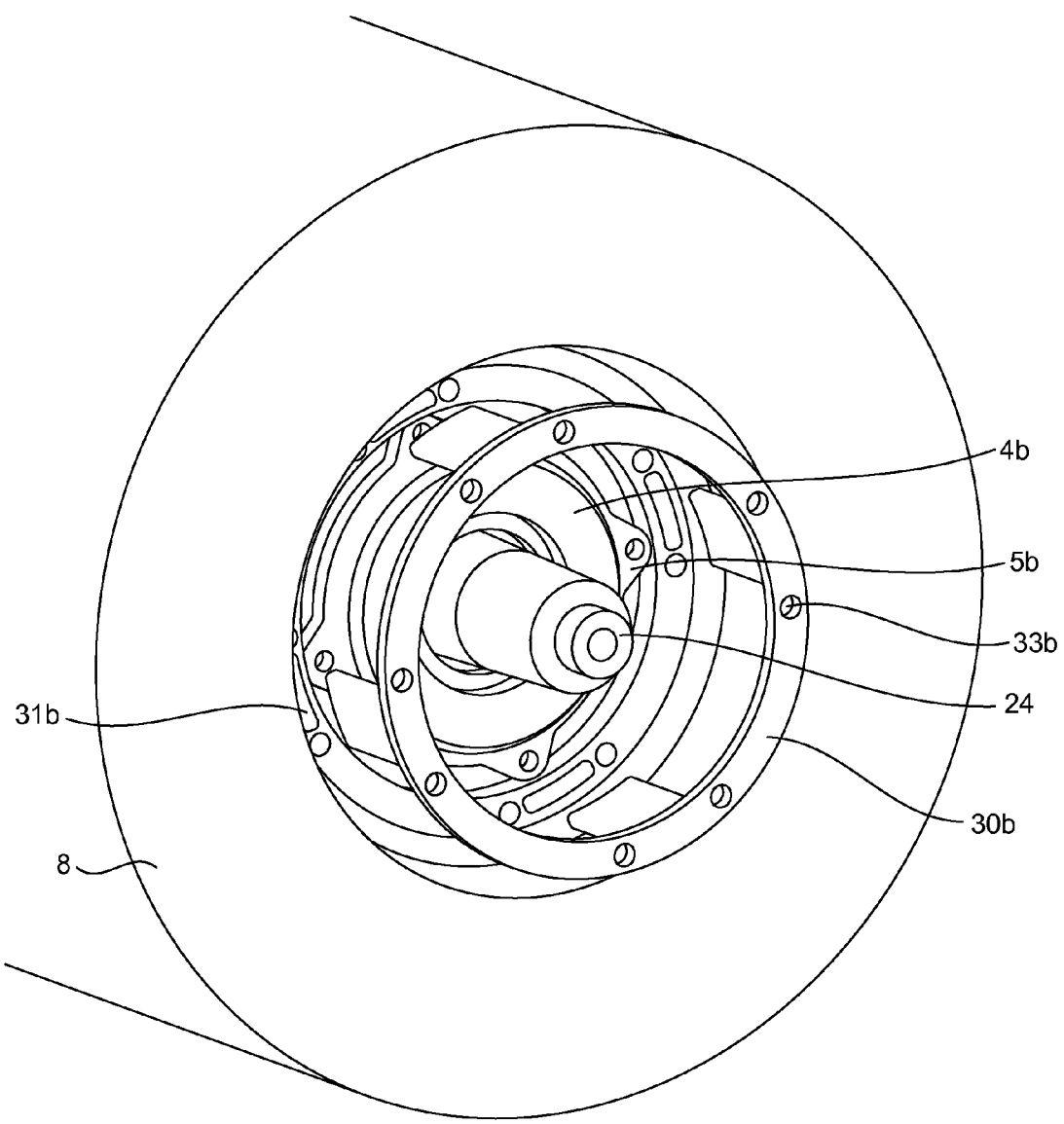
FIG. 10 is a perspective view of a state of the rotary electric motor in which attaching of the annular jig to the third bracket portion is in progress.
Figure 11:
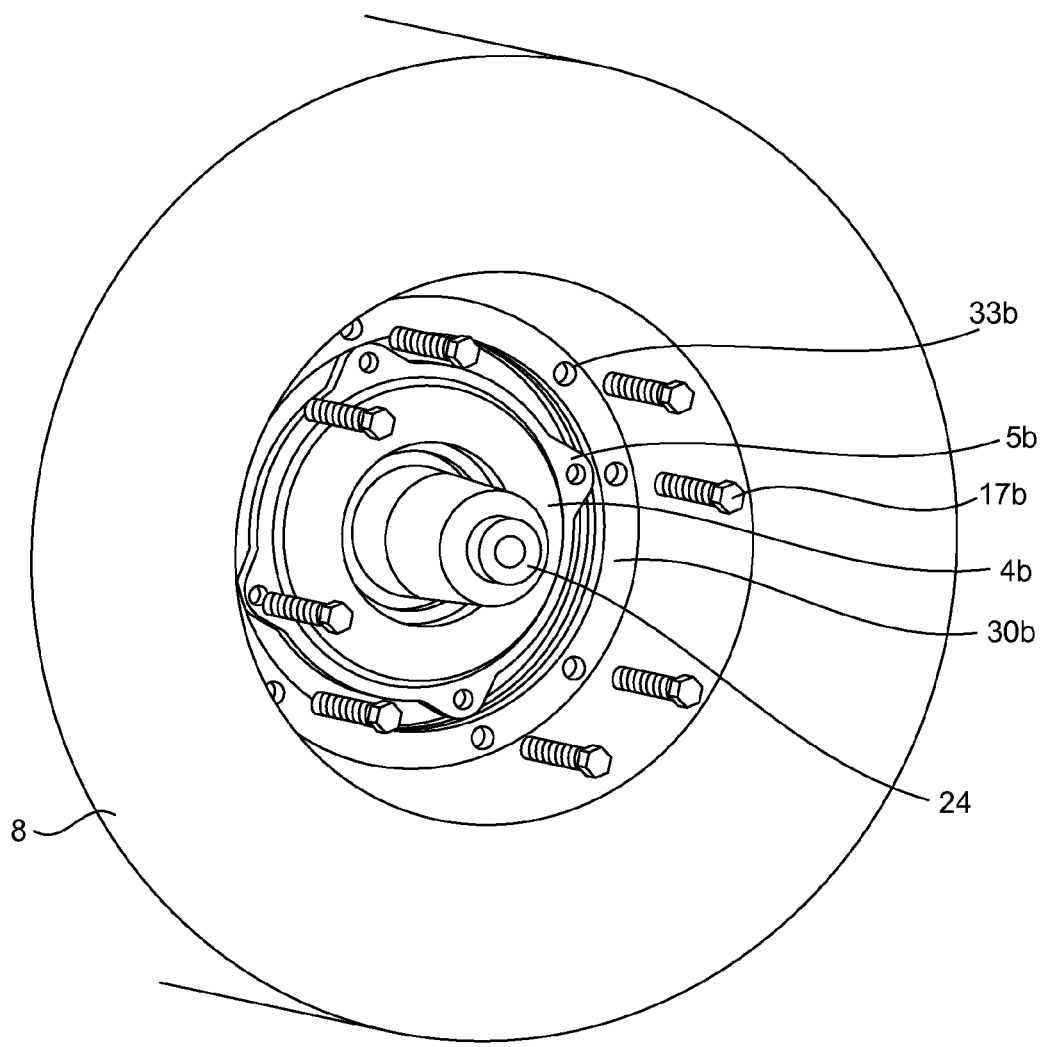
FIG. 11 is a perspective view of a state of the rotary electric machine in which the annular jig is attached to the third bracket portion.

In FIGS. 10 and 11, the annular jig 30b is fixed to the third bracket portion 8 by using the bolts 17b inserted through the bolt insertion holes 33b similarly to the annular jig 30a. The annular jig 30b is attached to the third bracket portion 8. However, if a space is created between the end portions 34b (see FIG. 2) and the recessed portions 23b (see FIG. 1), there is a possibility that the axial center position of the rotor 20 is displaced and the outer peripheral surface of the lamination core 25 interferes with the inner peripheral surface of the stator iron core 41. To prevent such interference, it is desirable to screw the bolts 17b into the bolt insertion holes 33b so as to fix the annular jig 30b to the third bracket portion 8.

As shown in FIG. 11, the cartridge 5b which is arranged an inner-diameter side of the annular jig 30b attached to the third bracket portion 8 is in condition that can be detached and attached. At this time, the iron core holder 21b is fixed by the annular jig 30b, and therefore, even when the cartridge 5b is removed in this state, the lamination core 25 does not contact the stator iron core 41. Therefore, the cartridge 5b can be removed after removing the bearing stopper 3b shown in FIG. 1. It suffices that after a new cartridge 5b in which the bearing 10b and grease are replaced is attached, the bolts 17b and the annular jig 30b are removed and the bearing stopper 3b is attached. The bearing cap 4b remains attached to the cartridge 5b and is removed along with the cartridge 5b. Thereafter, the bearing cap 4b is removed from the cartridge 5b, thereby taking out the bearing 10b.

Figure 12:
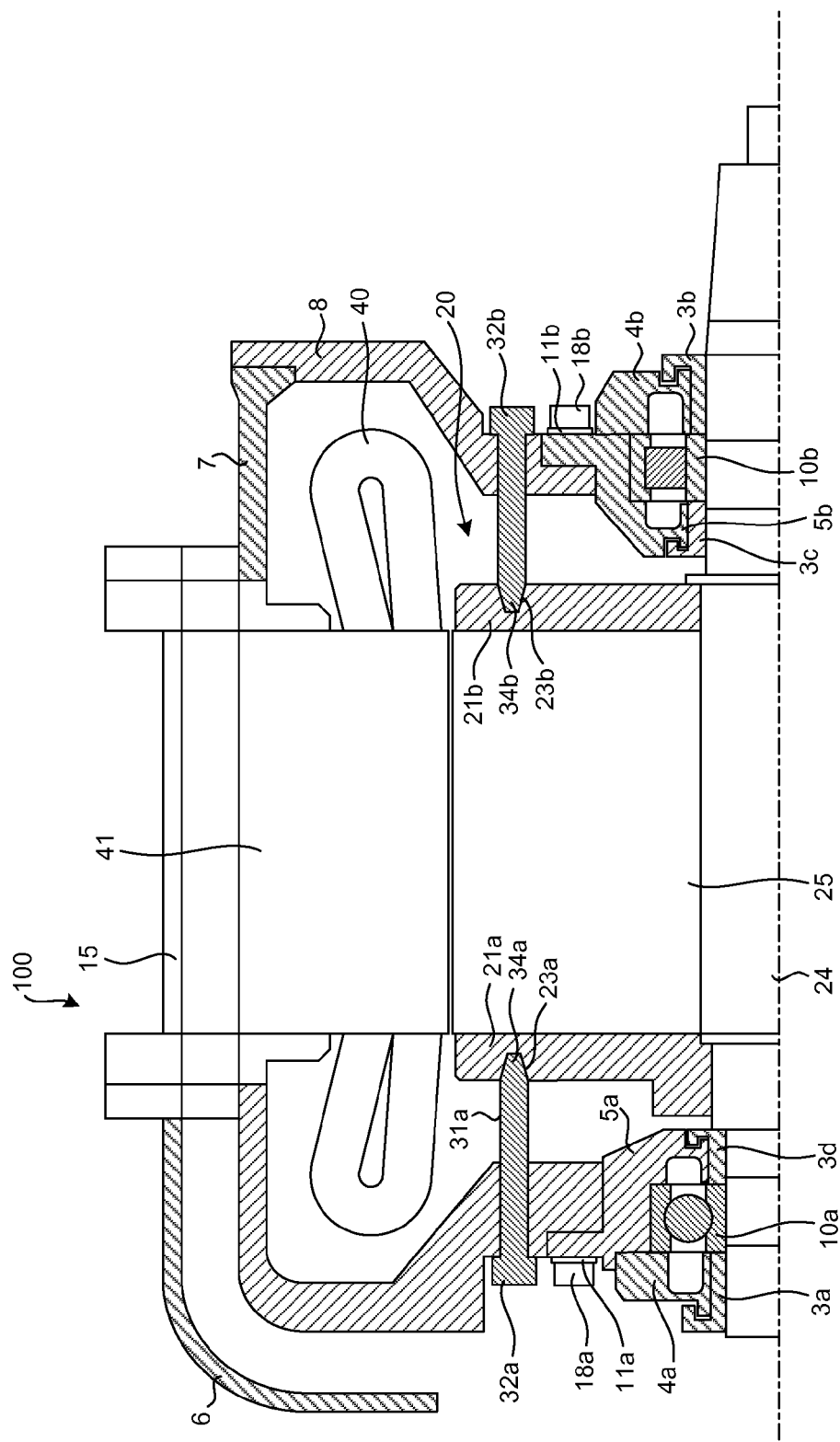
FIG. 12 is a vertical sectional view of a state of the rotary electric machine in which annular jigs are attached.

FIG. 12 is a vertical sectional view of a state of the rotary electric machine 100 in which the annular jigs 30a and 30b are attached. Differences between FIG. 1 and FIG. 12 are described as follows. In the first bracket portion 6, the annular plate 32a and the rotor supporting unit 31a are attached, and the end portion 34a of the rotor supporting unit 31a is fitted into the recessed portion 23a formed on the iron core holder 21a. In the third bracket portion 8, the annular plate 32b and the rotor supporting unit 31b are attached, and the end portion 34b of the rotor supporting unit 31b is fitted into the recessed portion 23b formed on the iron core holder 21b.

In the first bracket portion 6, insertion holes for the bolts 17a shown in FIG. 1 and insertion holes for the rotor supporting unit 31a shown in FIG. 12 are formed at mutually different positions. Specifically, these insertion holes are formed corresponding to the position of the rotor supporting units 31a and 31b formed in the annular jigs 30a and 30b shown in FIG. 2 and to the position of the bolt insertion holes 33a and 33b.

Figure 13:
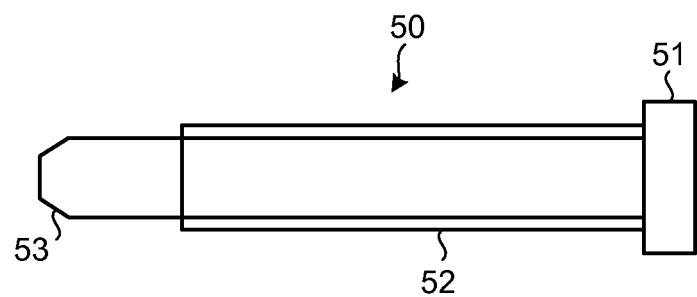
FIG. 13 depicts the configuration of a bolt-shaped jig.
Figure 14:
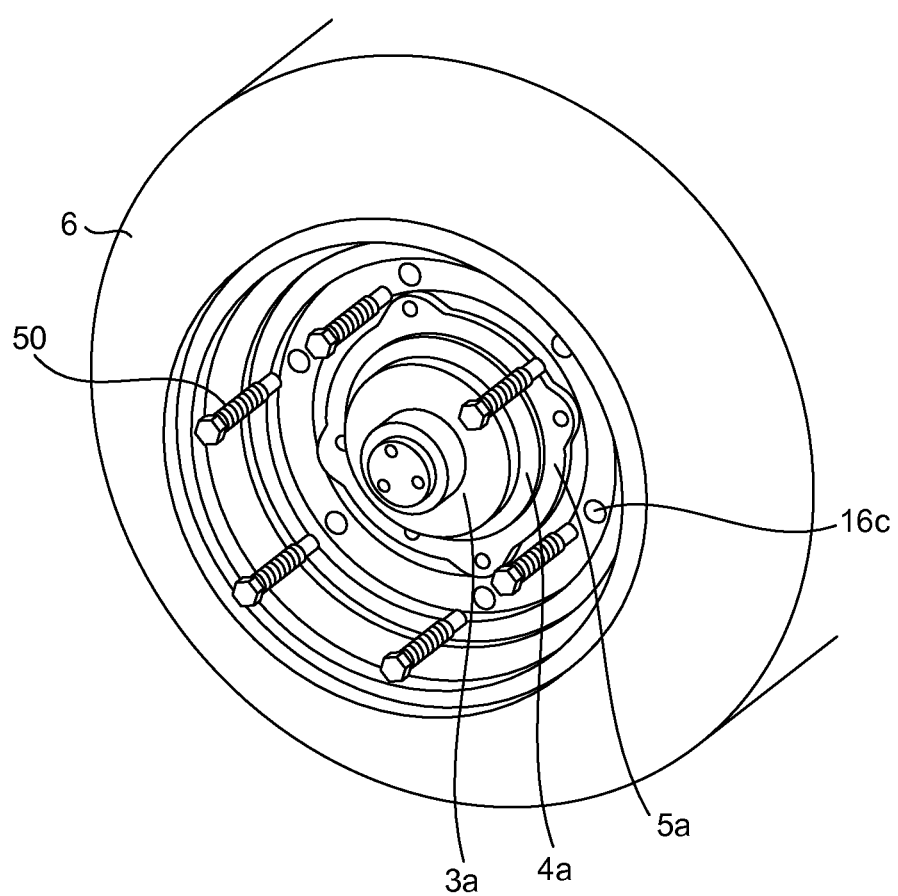
FIG. 14 is an explanatory diagram of a bolt insertion hole formed on the first bracket portion.
Figure 15:
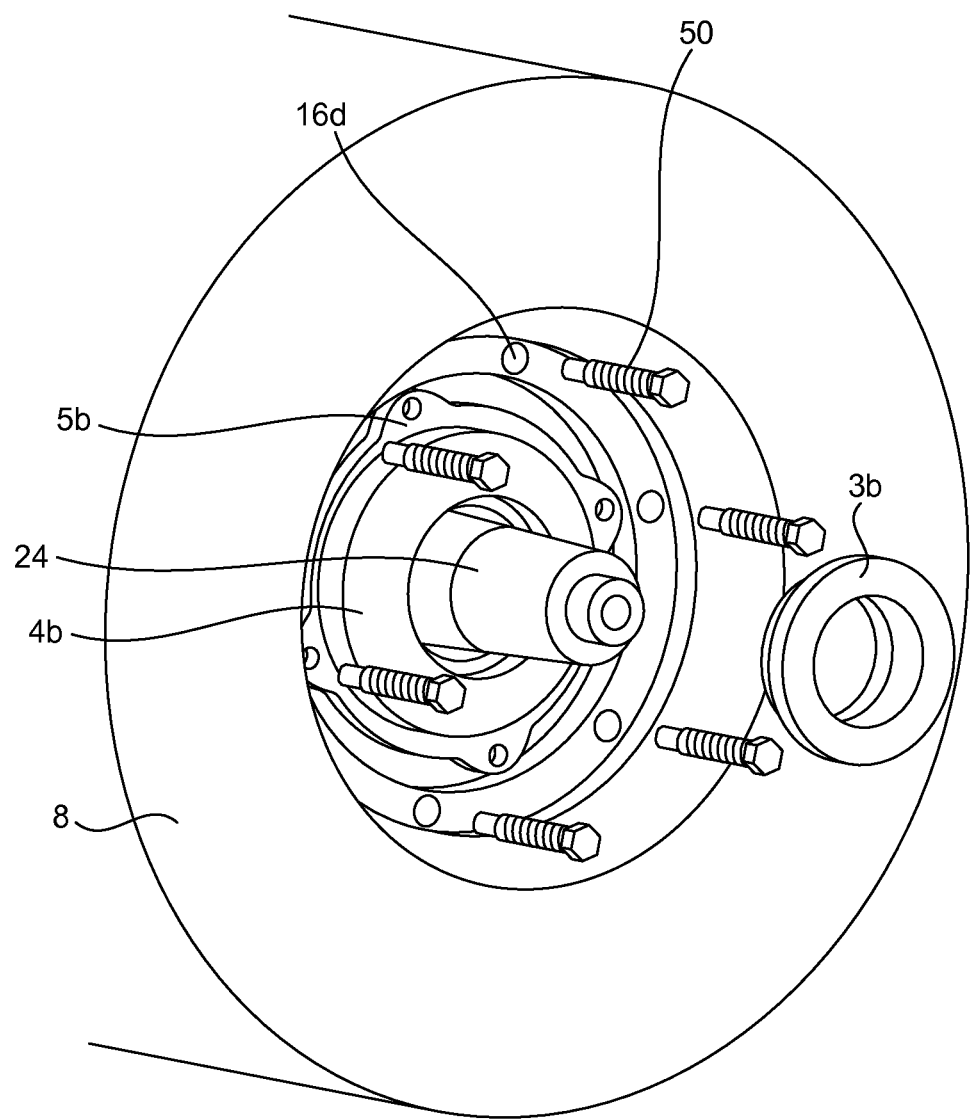
FIG. 15 is an explanatory diagram of a bolt insertion hole formed on the third bracket portion.

Another configuration example of a jig is explained next with reference to FIG. 13. FIG. 13 depicts the configuration of a bolt-shaped jig 50, FIG. 14 is an explanatory diagram of a bolt insertion hole 16c formed on the first bracket portion 6, FIG. 15 is an explanatory diagram of a bolt insertion hole 16d formed on the third bracket portion 8. Similarly to the annular jigs 30a and 30b shown in FIG. 2, the bolt-shaped jig 50 shown in FIG. 13 is attached to the first bracket portion 6 or the third bracket portion 8, and functions as a rotor supporting member.

In the bolt-shaped jig 50, a male thread portion 52 that can be screwed into a plurality of the bolt insertion holes 16c formed on the first bracket portion 6 or a plurality of the bolt insertion holes 16d formed on the third bracket portion 8 is formed from a bolt head 51 to a predetermine position. The bolt insertion hole 16c shown in FIG. 14 is a portion corresponding to the bolt insertion hole 16a shown in FIG. 5. The bolt insertion hole 16d shown in FIG. 15 is a portion corresponding to the insertion hole 16b shown in FIG. 9. The predetermined position is a length including the thickness of the first bracket portion 6 or the third bracket portion 8, for example. The bolt insertion holes 16c and 16d are each normally closed by a bolt (not shown). That is, a bolt shorter than the bolt-shaped jig 50 (for example, a bolt formed with a length such that its distal end does not contact the iron core holder 21a and the iron core holder 21b) is screwed into each of the bolt insertion holes 16c and 16d before the bolt-shaped jig 50 is attached. Therefore, the bolt-shaped jig 50 is mounted after removing these bolts. FIGS. 14 and 15 depict a state in which the shorter bolt (not shown) that closes each of the insertion hole 16c and the insertion hole 16d has been already removed, and the bolt-shaped jig 50 is being screwed into each of the insertion hole 16c and the insertion hole 16d.

For example, an end portion 53 of the bolt-shaped jig 50 can be formed into a tapered shape that is tapered from the bolt head 51 side toward a distal end of the end portion 53 similarly to the end portions 34a and 34b shown in FIGS. 4(a) and 4(b), or can be formed into a rectangular shape similarly to the end portions 34a and 34b shown in FIG. 4(c).

A relationship between a cross section of the end portion 53 and a cross section of the recessed portion 23a is explained more specifically.

First, a case in which a cross section of the recessed portions 23a and 23b is formed into a tapered shape is explained. (1) The cross section of the recessed portions 23a and 23b along the radial direction of the rotor 20 is assumed to be formed into a tapered shape in which the end portion 53 can contact the side surface of the recessed portions 23a and 23b before the end portion 53 reaches the bottom surface of the recessed portions 23a and 23b. At this time, the cross section of the end 53 when the end portion 53 is fitted into the recessed portions 23a and 23b can be formed into a rectangular shape (1a) or a tapered shape (1b). The shape formed by combining (1) and (1a) corresponds to the shape in FIG. 4(c).

Next, a case in which a cross section of the end portion 53 is formed into a tapered shape is explained. (2) The cross section of the end portion 53 when the end 53 is fitted into the recessed portions 23a and 23b is assumed to be formed into a tapered shape in which a top of the recessed portions 23a and 23b can contact the end portion 53 before the end 53 reaches the bottom surface of the recessed portions 23a and 23b. At this time, the cross section of the recessed portions 23a and 23b along the radial direction of the rotor 20 can be formed into a rectangular shape (2a) or a tapered shape (2b). The shape formed by combining (2) and (2a) corresponds to the shape in FIG. 4(b). The shape formed by combining (2) and (2b) corresponds to the shape in FIG. 4(a).

The bolt-shaped jig 50 shown in FIG. 13 can be manufactured at a lower cost as compared to the annular jigs 30a and 30b because an existing bolt can be machined to be utilized as the bolt-shaped jig 50. It is desirable that at least three bolt-shaped jigs 50 are used to fix the rotor 20 stably. To prevent the axial center position of the rotor 20 from being displaced from the axial center position of the frame 15, the size of the bolt-shaped jig 50 is selected desirably by considering the weight of the rotor 20 and the like. A bearing replacement method using the bolt-shaped jig 50 is same as the bearing replacement method using the annular jigs 30a and 30b, and therefore explanations thereof will be omitted.

The rotary electric machine 100 can have a mode in which the respective jigs 30a, 30b, and 50 described above can be attached only to the side of a cartridge (for example, the cartridge 5b) that is expected to be replaced more frequently. In this case, the manufacturing cost of the rotor 20 can be reduced. Also with this configuration, for example, the driven-side rotor shaft 24 is supported by the bearing 10a when the cartridge 5b is removed. Therefore, workability of replacing the cartridge 5b does not deteriorate.

Four rotor supporting units 31a and 31b are uprightly arranged respectively on the annular plates 32a and 32b shown in FIG. 2. However, the present invention is not limited thereto, and it suffices that at least two rotor supporting units 31a and 31b are uprightly arranged respectively on the annular plates 32a and 32b. For example, in a case in which there are two rotor supporting units 31a and 31b, when an area of each of the rotor supporting units 31a and 31b is increased in a circumferential direction of the annular plates 32a and 32b, the rotor 20 can also be fixed stably. In this case, it is assumed that the number of the insertion holes 16a formed on the first bracket portion 6 corresponds to the number of the rotor supporting units 31a. The same applies to the third bracket portion 8.

The rotary electric machine 100 according to the present embodiment is not limited to a hermetic externally fan-cooled motor.

In addition, in the above explanations, the frame 15, the first bracket portion 6, and the third bracket portion 8 are configured separately from one another. However, the present invention is not limited thereto. The rotary electric machine, the bearing attaching and detaching jig, and the bearing replacement method according to the present embodiment are also applicable to a rotary electric machine including a frame in which the frame (the cylindrical portion) 15, the first bracket portion 6 (rotor-shaft supporting unit), and the third bracket 8 (rotor-shaft supporting unit), all shown in FIG. 1, are configured integrally with one another.

As described above, the rotary electric machine 100 according to the present embodiment includes the stator iron core 41 held within the cylindrical frame 15, the rotor 20 including the lamination core 25 that is arranged within the stator iron core 41 and is constituted by laminating electromagnetic steel plates and the iron core holders (21) that cover both ends of the lamination core 25, and the bearing portions (5a and 5b) that are detachably attached to the frame 15 (including the first to third bracket portions 6, 7, and 8) and rotatably support the rotor shaft 24, wherein on the iron core holders (21), the recessed portions (23a and 23b) are circumferentially provided, into which the end portions (34a, 34b, and 53) of the jigs (30a, 30b, and 50) inserted through the frame 15 are fitted to enable the bearing portions (5a and 5b) to be detached and attached. Therefore, the rotor 20 can be fixed in its radial direction (in the direction of radius of the rotor 20). Generally, a gap between the outer peripheral surface of the rotor 20 and the inner peripheral surface of the stator iron core 41 is approximately several millimeters. Therefore, considerable care needs to be taken in pulling out the rotor 20 from the frame 15 to attach and detach the cartridges 5a and 5b so as not to bring the outer peripheral surface of the rotor 20 into contact with the inner peripheral surface of the stator iron core 41. In the rotary electric machine 100 according to the present embodiment, the rotor 20 can be fixed by the annular jigs 30a and 30b or the bolt-shaped jig 50 with almost no displacement of the axial center position of the rotor 20 from the axial center position of the frame 15. Therefore, not only conventional work to attach and detach the rotor 20 is made unnecessary, but also the axial center position of the rotor shaft 24 is hardly displaced from the center position of the bearings 10a and 10b. Accordingly, the cartridges 5a and 5b can be replaced quickly.

In the rotary electric machine 100 according to the present embodiment, it is not necessary to pull out the rotor 20 from the frame 15. Therefore, a crane for suspending the rotor 20 for a railway vehicle, which weighs 100 kilograms or more, a special jig for detaching the cartridges 5a and 5b, and the like are made unnecessary. Furthermore, in a case of a permanent-magnet-excited synchronous machine, the rotor 20 generates a strong magnetic force. Therefore, when the rotor 20 is pulled out from the frame 15, there is not only a possibility that a magnetic substance around the rotary electric machine 100 undergoing maintenance is attracted to the rotor 20, but there is also a possibility of causing a repulsive force or an attractive force between the rotor 20 having been pulled out and the frame 15. In the rotary electric machine 100 according to the present embodiment, the cartridges 5a and 5b can be replaced without causing these risks.

The annular jigs 30a and 30b according to the present embodiment, which are bearing attaching and detaching jigs, are inserted through the bracket portions (6 and 8) to enable the cartridges 5a and 5b to be detached and attached. The end portions 34a and 34b fitted into the recessed portions 23a and 23b provided circumferentially on the iron core holders (21) are configured to be uprightly arranged on the annular plates 32a and 32b. Therefore, the rotor 20 can be fixed without bringing the lamination core 25 into contact with the stator iron core 41 when the cartridges 5a and 5b are detached and attached.

The bolt-shaped jig 50 according to the present embodiment, which is a bearing attaching and detaching jig, is inserted into the bracket portions (6 and 8) to enable the cartridges 5a and 5b to be detached and attached, and has a bolt shape to be fitted into the recessed portions 23a and 23b provided circumferentially on the iron core holders (21). Therefore, the rotor 20 can be fixed without bringing the lamination core 25 into contact with the stator iron core 41 when the cartridges 5a and 5b are detached and attached, and the bolt-shaped jig 50 can also be manufactured at a lower cost than the annular jigs 30a and 30b.

INDUSTRIAL APPLICABILITY

As described above, the present invention is applicable to a rotary electric machine, and is particularly useful as an invention that can facilitate bearing attachment and detachment work.

REFERENCE SIGNS LIST 13a, 13b cover
2 fan
3a, 3b, 3c, 3d bearing stopper
4a, 4b bearing cap
5a cartridge (bearing portion)
5b cartridge (bearing portion)
6 first bracket portion (rotor-shaft supporting unit)
7 second bracket portion
8 third bracket portion (rotor-shaft supporting unit)
10a, 10b bearing
11a, 11b washer
15 frame (cylindrical portion)
16a, 16b insertion hole
17a, 17b, 18a, 18b bolt
20 rotor
21a, 21b iron core holder
23a, 23b recessed portion
24 rotor shaft
25 lamination core
30a, 30b annular jig
31a, 31b rotor supporting unit (supporting unit)
32a, 32b annular plate
33a, 33b bolt insertion hole
34a, 34b, 53 end
40 stator coil
41 stator iron core (stator)
50 bolt-shaped jig
51 bolt head
52 male thread portion
100 rotary electric machine

The invention claimed is:

1. A rotary electric machine comprising:
a stator;
a rotor including a rotor core that is arranged within the stator and is constituted by laminating electromagnetic steel plates and an iron core holder that covers both ends of the rotor core;
a frame including a cylindrical portion that encloses the stator and the rotor and a rotor-shaft supporting unit that extends in the direction of a rotor shaft of the rotor and supports the rotor shaft; and a bearing portion that is detachably attached to the rotor-shaft supporting unit and rotatably supports the rotor shaft, wherein on the iron core holder, a recessed portion having a bottom wall and two side walls extending from the bottom wall is provided, the recessed portion extends circumferentially entirely around the rotor shaft and into which an end portion of a jig, that is inserted through the rotor-shaft supporting unit such that the bearing portion is attached and detached, is fitted to enable the bearing portion to be detached and attached.

2. The rotary electric machine according to claim 1, wherein a cross section of the recessed portion along a radial direction of the rotor is formed into a tapered shape such that the end portion can contact a side surface of the recessed portion before the end portion reaches a bottom surface of the recessed portion.

3. The rotary electric machine according to claim 2, wherein a cross section of the end portion along the radial direction when the end portion is fitted into the recessed portion is formed into a rectangular shape.

4. The rotary electric machine according to claim 2, wherein a cross section of the end portion along the radial direction when the end portion is fitted into the recessed portion is formed into a tapered shape.

5. The rotary electric machine according to claim 1, wherein a cross section of the end portion along a radial direction of the rotor when the end portion is fitted into the recessed portion is formed into a tapered shape such that a top of the recessed portion can contact the end portion before the end portion reaches a bottom surface of the recessed portion.

6. The rotary electric machine according to claim 5, wherein a cross section of the recessed portion along the radial direction is formed into a rectangular shape.

7. The rotary electric machine according to claim 5, wherein a cross section of the recessed portion along the radial direction is formed into a tapered shape.

* * * * *